(12) United States Patent
Prescott

(10) Patent No.: US 7,401,576 B2
(45) Date of Patent: Jul. 22, 2008

(54) CORRAL PANEL

(76) Inventor: Ted W. Prescott, 536 Ryndon, Unit 16, Elko, NV (US) 89801

( * ) Notice: Subject to any disclaimer, the term of this patent is extended or adjusted under 35 U.S.C. 154(b) by 492 days.

(21) Appl. No.: 11/219,704

(22) Filed: Sep. 7, 2005

(65) Prior Publication Data

US 2006/0070582 A1    Apr. 6, 2006

Related U.S. Application Data

(60) Provisional application No. 60/614,467, filed on Oct. 1, 2004.

(51) Int. Cl.
*A01K 3/00* (2006.01)
(52) U.S. Cl. .......................... 119/512; 256/24
(58) Field of Classification Search .............. 119/512, 119/513, 514, 519, 524; D30/108; 256/24, 256/25, 26, 27, 59, 73; D25/38, 39
See application file for complete search history.

(56) References Cited

U.S. PATENT DOCUMENTS

| 741,650 A | 10/1903 | Frey | |
|---|---|---|---|
| 1,214,705 A | 2/1917 | Neely | |
| 5,533,714 A | 7/1996 | St. John | |
| 5,584,330 A | * 12/1996 | Muller | ................. 160/135 |
| 5,794,923 A | * 8/1998 | Bartlett | ................. 256/64 |
| 2002/0148411 A1 | 10/2002 | Markham | |

FOREIGN PATENT DOCUMENTS

CA        1091968        12/1980

* cited by examiner

*Primary Examiner*—Yvonne R. Abbott
(74) *Attorney, Agent, or Firm*—Richard C. Litman

(57) ABSTRACT

The corral panel is a generally V-shaped body generally forming an isosceles triangle. A first pole, a second pole and at least one crossbar form the corral panel. The first and second poles are substantially equal in length. Each pole has a first end and a second end. The second end of each pole is joined together to define a vertex of the V-shaped body. The corral panel is used to create an oblique corral assembly by joining an inverted triangular corral panel between adjoining rectangular corral panels to form a round corral in which the corral panels slope obliquely outward relative to vertical.

14 Claims, 3 Drawing Sheets

CORRAL PANEL

CROSS-REFERENCE TO RELATED APPLICATION

This application claims the benefit of U.S. Provisional Patent Application Ser. No. 60/614,467, filed Oct. 1, 2004.

BACKGROUND OF THE INVENTION

1. Field of the Invention

The present invention relates to corral panels. More particularly, the invention relates to a portable corral panel and a method for creating oblique corral assemblies.

2. Description of the Related Art

Corral panels may be arranged to make any shape of enclosure, the most common shapes being circular or of the square/rectangular variety. Portable corrals are often formed by joining together a number of rectangular panels in a shape that, while technically polygonal, has a sufficient number of panels that the corral is referred to as a round corral. In such a corral, the panels are disposed perpendicular to the ground.

Corrals come in a variety of sizes and are effective for fencing in or keeping out animals. Horse corrals are effective in retaining horses, but can be harmful to both a rider and a reined horse. For instance, in the type of corral described above, it is highly possible that the rider's foot can become caught on the perpendicular corral panels, or between the joints in the panels. It is also possible that reins on a horse may be caught on the erect corral panel or in the joints between panels, jerking and possibly harming the horse.

A corral panel is desired that can be positioned to create an oblique corral assembly that angles out or slopes outward as the corral rises above the ground to provide room for the rider's feet when riding the horse in the corral and to prevent the reined horse from accidentally being caught on the corral panel. Thus, a corral panel solving the aforementioned problems is desired.

SUMMARY OF THE INVENTION

The corral panel is a generally V-shaped body. A first pole, a second pole, and at least one crossbar form the corral panel into a substantially isosceles triangle shape. The first and second poles are substantially equal in length. Each pole has a first end and a second end, the second end of the poles being joined together to define a vertex of the V-shaped body. The crossbar may be placed across the first ends of the poles, forming the base of the triangle, and/or one or more crossbars may be placed between the two poles to form substantially isosceles triangles of smaller area. The corral panel is used to create an oblique corral assembly by joining the corral panel in an inverted position between generally rectangular corral panels. This causes the corral panels to slope or tilt obliquely outward from vertical as the panels rise above the ground, providing a buffer area at the height of a rider's boots or a horse's reins.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
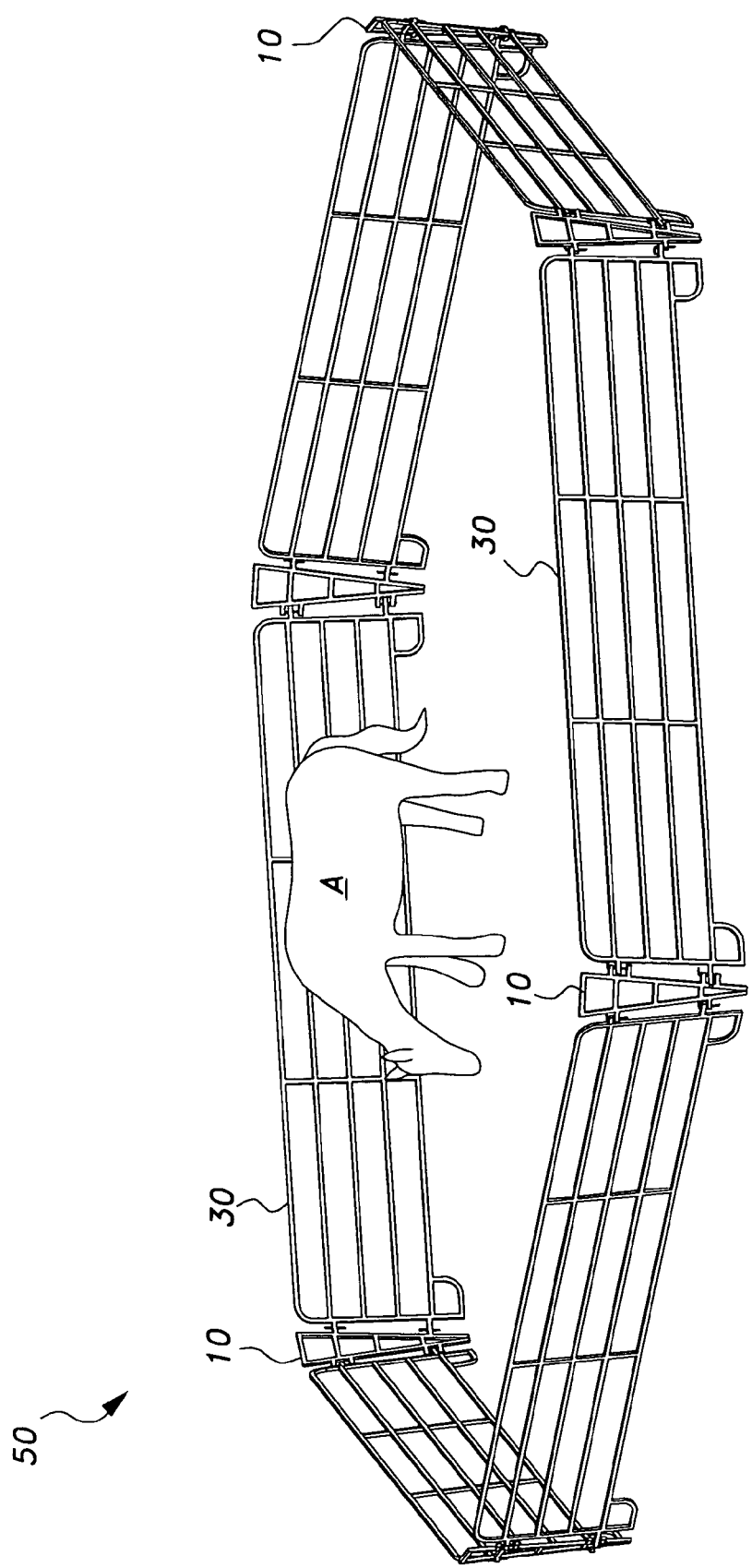
FIG. 1 is an environmental, perspective view of a corral incorporating a corral panel according to the present invention.

The present invention is a corral panel, designated generally as 10 in the drawings. As shown in FIG. 1, the corral panel 10 has a V-shaped body generally forming an isosceles triangle. The corral panels 10 create an oblique corral assembly 50 by being placed in an inverted position between generally rectangular corral panels 30, which causes the corral panels 10 and 30 to tilt at outwardly at an oblique angle relative to vertical as the panels 10 and 30 rise above the ground. The oblique corral assembly 50 provides an enclosure for animals, such as horse, cattle or pets.

The oblique corral assembly 50 is especially useful as a horse corral. The sloping arrangement of the oblique corral assembly 50 provides added room at the top of the corral that provides additional room in order to prevent a rider from catching their foot on the panels or between the joints in the panels. The added room at the top of the oblique corral assembly 50 also helps to prevent a horse's reins from being caught on the corral, which could harm the horse.

Figure 2:
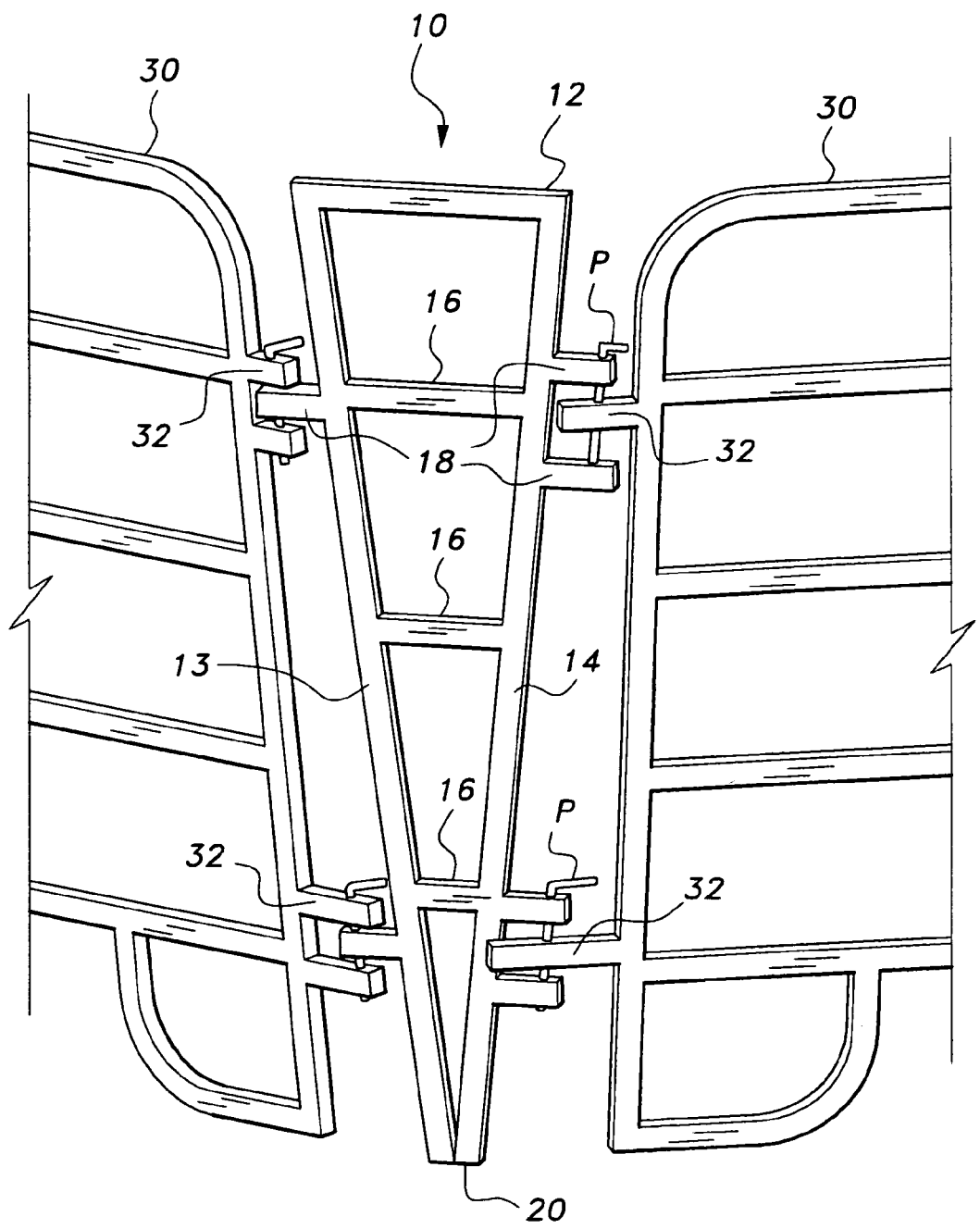
FIG. 2 is an environmental front view of a corral panel according to the present invention.

Referring now to FIG. 2, the corral panel 10 is formed by a first pole 13, a second pole 14 and a crossbar 12. The first and second poles 13, 14 are substantially equal in length and may be any length. Preferably, the poles 13, 14 are about sixty inches long. Each pole 13, 14 has a first end and a second end. The second ends of the poles 13, 14 are joined together to define a vertex 20 of the V-shaped body.

The crossbar 12 has a first end and a second end connected between the first end of the first pole 13 and the second pole 14. The crossbar 12 may be any length. A preferred length is about fifteen inches. The corral panel 10 may further comprise one or more intermediate crossbars 16 disposed between the first pole 13 and the second pole 14 parallel to crossbar 12 and defining similar isosceles triangles of smaller area than the triangle defined by crossbar 12. The crossbars 16 provide added strength to the framework of the corral panel 10. Panel 10 may be made to have any one of the intermediate crossbars 16, a plurality of crossbars 16, or simply just crossbar 12 across the ends of poles 13 and 14.

The corral panels 10 are fastened to the generally rectangular panels 30 by connector pins P. Specifically, connection elements 18, extending from outer portions of the poles 13, 14, are aligned with connection elements 32, which extend from the generally rectangular corral panels 30. The connector pins P are inserted through holes defined in the connection elements 18 of panel 10 and the connection elements 32 of the generally rectangular panel 30 to unite the panels together and to create the oblique corral assembly 50. Placing inverted corral panels 10 between the generally rectangular corral panels 30 creates the oblique corrals. Corral panel 10 may have two pairs of parallel connector arms 18 extending from one pole 14 and a pair of single connector arms 18 extending from the other pole 13 that are adapted to link with complementary connector arms 32 on conventional rectangular portable corral panels 30.

Figure 3:
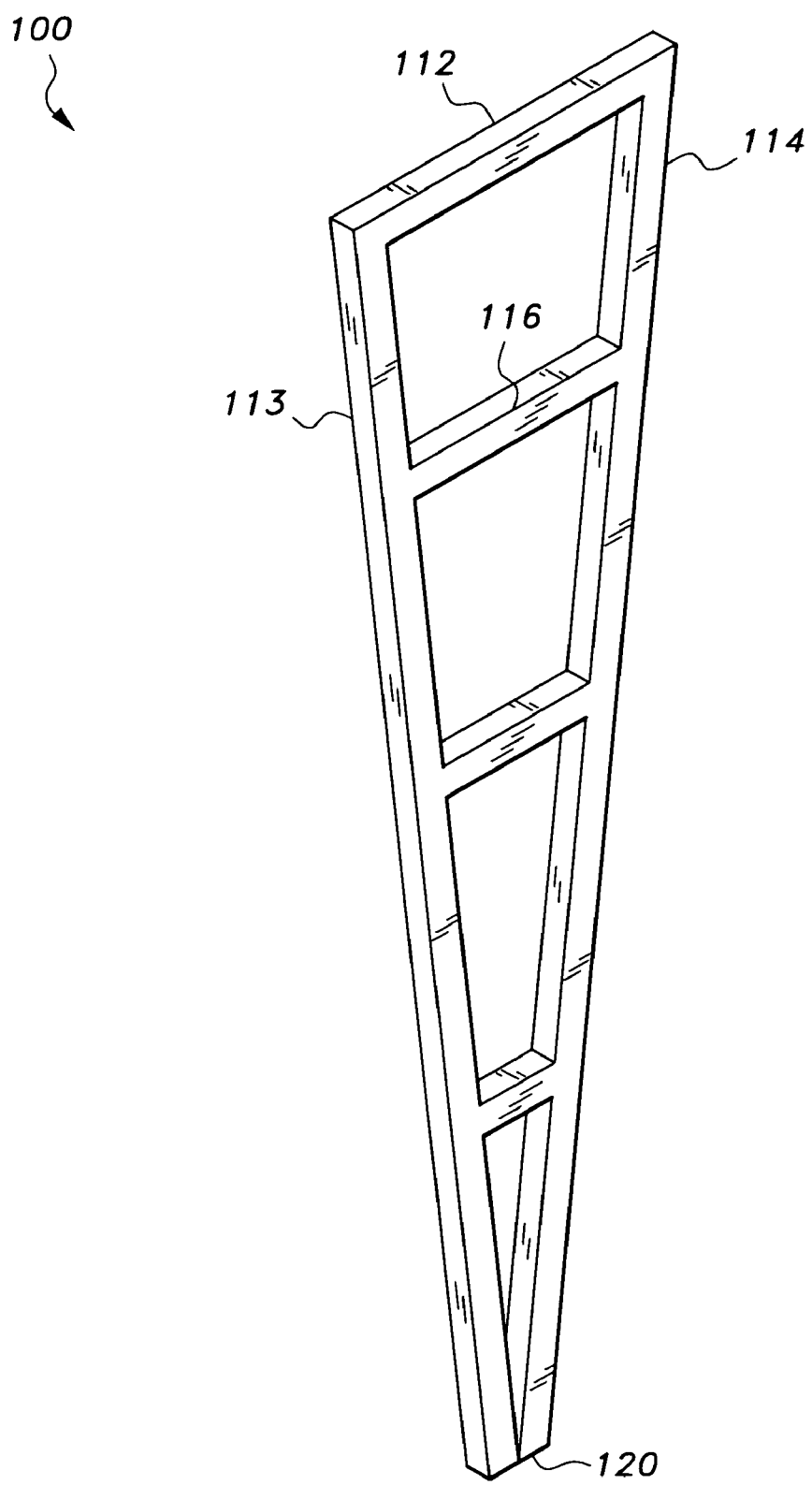
FIG. 3 is a perspective view of an alternative embodiment of a corral panel.

Referring now to FIG. 3, an alternative corral panel 100 may be made without the connection elements 18 of panel 10. Corral panel 100, like corral panel 10, is made of crossbars 112, 116 and poles 113, 114, which form a vertex 120. The corral panel 100 is designed for use with generally rectangular panels that lack connection elements 32 or other connection adapters, such as Priefert type corral panels, made by the Priefert Mfg Co. Inc. of Mt. Pleasant, Tex.

Priefert-type panels are assembled into a corral using chains as connectors. The chains are wound between and supported by crossbars on the Priefert-type panels. Therefore, when using panels 100 with the Priefert type panels, chains are wound around the crossbars 116 of panels 100 and the crossbars on the Priefert-type panels to create the oblique corral assembly. Crossbars 116, therefore, not only provide support for the poles 113, 114, but they also provide support for chains when using Priefert-type panels to create the oblique corrals. Placing inverted corral panels 100 between the Priefert-type corral panels also creates an oblique corral.

The panels 10, 100 are made of lightweight tubing generally used in the art of making portable corral panels. For instance, the panels 10, 100 should be made of lightweight yet sturdy steel that can be easily lifted by one person. The panels 10, 100 may be made using sixteen gauge tubular steel, but other gauges of steel may be used equally as well.

It is to be understood that the present invention is not limited to the embodiments described above, but encompasses any and all embodiments within the scope of the following claims.

I claim:

1. A V-shaped corral panel for forming an oblique corral assembly, comprising:
   a first pole and a second pole substantially equal in length, each of the poles having a first end and a second end, the second end of the poles being joined together defining a vertex, the poles forming a V-shaped body;
   at least one crossbar having a first end and a second end, the first end of the crossbar being connected to the first pole, the second end of the crossbar being connected to the second pole, wherein the crossbar and side poles form a substantially isosceles triangle; and
   means for attaching the first and second poles between adjoining rectangular corral panels with the triangle in an inverted configuration so that the corral panels slope obliquely outward relative to vertical as the panels rise above the ground.

2. The V-shaped corral panel of claim 1, wherein said at least one crossbar comprises a top crossbar connecting the first end of said first pole and the first end of said second pole together.

3. The V-shaped corral panel of claim 1, wherein said first and second poles and said crossbar are made from tubular stock.

4. The V-shaped corral panel of claim 1, wherein said means for attaching comprises a plurality of connector arms extending from said first and second poles, each of the connector arms having a hole defined therein adapted for receiving a pin linking the connector arms to corresponding connector arms extending from the rectangular corral panels.

5. The V-shaped corral panel of claim 4, wherein said plurality of connector arms comprises a pair of spaced apart connector arms extending from said first pole and two pairs of parallel connector arm extending from said second pole.

6. The V-shaped corral panel of claim 1, wherein said means for attaching comprises a plurality of connector arms extending from said first and second poles, each of the connector arms having a hole defined therein, and a plurality of pins adapted for insertion through the holes in said connectors arms and aligned holes in corresponding connector arms extending from the rectangular corral panels.

7. The V-shaped corral panel of claim 1, wherein said means for attaching comprises chains wrapped around the at least one crossbar and adapted for wrapping around corresponding crossbars of the adjoining rectangular panels.

8. The V-shaped corral panel of claim 1, wherein said at least one crossbar comprises:
   a top crossbar connecting the first end of said first pole and the first end of said second pole together; and
   at least one intermediate crossbar extending between said first pole and said second pole parallel to the top crossbar.

9. A portable corral assembly, comprising:
   a plurality of generally rectangular corral panels;
   a plurality of inverted triangular corral panels; and
   means for linking one of the inverted triangular corral panels between each adjoining pair of the rectangular corral panels so that the corral panels form a round corral with the corral panels sloping obliquely outward relative to vertical to provide a wider perimeter at the top of the round corral than at the base of the round corral.

10. The portable corral assembly according to claim 9, wherein each of said inverted triangular corral panels comprises a pair of poles joined at an acute angle and a top crossbar joined across the ends of the poles to form an isosceles triangle.

11. The portable corral assembly according to claim 10, further comprising at least one intermediate crossbar extending between the two poles parallel to the top crossbar for increased rigidity.

12. The portable corral assembly according to claim 10, wherein said poles and said crossbar are made from tubular stock.

13. The portable corral assembly according to claim 10, wherein said linking means comprises a plurality of connector arms extending from the poles of said inverted triangular corral panels, a plurality of corresponding connector arms extending from said rectangular corral panels, and a plurality of pins inserted through aligned holes defined in the connector arms extending from said inverted triangular corral panels and said rectangular corral panels.

14. The portable corral assembly according to claim 9, wherein said linking means comprises a plurality of chains wrapped around said adjoining inverted triangular and rectangular corral panels.

* * * * *